US009115647B2

(12) United States Patent
Andre et al.

(10) Patent No.: US 9,115,647 B2
(45) Date of Patent: Aug. 25, 2015

(54) METHOD FOR MONITORING A PRESSURE RELIEF VALVE OF A FUEL INJECTION CIRCUIT FOR A TURBOMACHINE

(75) Inventors: Brice Andre, Montgeron (FR); Nicolas Potel, Maisons Alfort (FR)

(73) Assignee: SNECMA, Paris (FR)

( * ) Notice: Subject to any disclaimer, the term of this patent is extended or adjusted under 35 U.S.C. 154(b) by 269 days.

(21) Appl. No.: 13/552,066

(22) Filed: Jul. 18, 2012

(65) Prior Publication Data

US 2013/0019952 A1 Jan. 24, 2013

(30) Foreign Application Priority Data

Jul. 19, 2011 (FR) ...................................... 11 56536

(51) Int. Cl.
E03B 7/07 (2006.01)
F02C 7/236 (2006.01)
F02C 9/26 (2006.01)

(52) U.S. Cl.
CPC . *F02C 7/236* (2013.01); *F02C 9/26* (2013.01); *F05D 2270/3015* (2013.01)

(58) Field of Classification Search
CPC ............... F02C 7/224; F02C 7/30; F02C 9/28
USPC .................... 137/557; 73/716, 736
See application file for complete search history.

(56) References Cited

U.S. PATENT DOCUMENTS 3,451,551 A * 6/1969 Downey et al. .................. 210/90
3,452,586 A * 7/1969 Childs et al. ................ 73/61.73
6,220,228 B1 * 4/2001 Atkins ........................... 123/510
6,807,943 B2 * 10/2004 VanWeelden et al. ......... 123/458
7,024,980 B2 * 4/2006 Uryu et al. .......................... 92/72
2006/0243258 A1 * 11/2006 Withrow et al. ............. 123/559.1
2008/0289338 A1 * 11/2008 Desai ............................... 60/734
2009/0084193 A1 * 4/2009 Cerabone et al. ........... 73/861.64
2011/0139123 A1 * 6/2011 Brocard et al. ............... 123/458

FOREIGN PATENT DOCUMENTS

| EP | 1 061 243 A2 | 12/2000 |
|---|---|---|
| FR | 2 931 885 | 12/2009 |
| FR | 2 950 390 | 3/2011 |
| GB | 000855755 A * | 12/1960 |
| WO | WO 2010/092267 | 8/2010 |

OTHER PUBLICATIONS

French Search Report dated Mar. 22, 2012.

* cited by examiner

*Primary Examiner* — Craig Schneider
*Assistant Examiner* — Angelisa L Hicks
(74) *Attorney, Agent, or Firm* — Pillsbury Winthrop Shaw Pittman LLP

(57) ABSTRACT

A detection method of a breakdown of a pressure relief valve of a fuel injection circuit for a turbomachine, the injection circuit including a low pressure stage and a high pressure stage, the low pressure stage having an inlet and an outlet, the high pressure stage having an inlet and an outlet, the low pressure stage being connected to the high pressure stage, the pressure relief valve being connected in parallel with respect to the high pressure stage, the injection circuit further including a recirculation loop including an inlet connected to the outlet of the high pressure stage and an outlet connected to the outlet of the low pressure stage, the method including measuring a differential pressure in the injection circuit.

8 Claims, 1 Drawing Sheet

METHOD FOR MONITORING A PRESSURE RELIEF VALVE OF A FUEL INJECTION CIRCUIT FOR A TURBOMACHINE

CROSS REFERENCE TO RELATED APPLICATION

This application claims priority to French Application No. 1156536 filed Jul. 19, 2011, the entire content of which is incorporated herein by reference in its entirety.

FIELD

The present invention relates to a method for monitoring a pressure relief valve of a fuel injection circuit for a turbomachine.

BACKGROUND

A turbojet generally includes a fan, one or more compressor stages, for example a low pressure compressor and a high pressure compressor, a combustion chamber, one or more turbine stages, for example a high pressure turbine and a low pressure turbine, and an ejection nozzle. In the combustion chamber, compressed fuel is injected and burned with the compressed air originating from the compressors. Each compressor is integral in rotation with a turbine, to which it is connected by a shaft, thus forming a high pressure body and a low pressure body.

The combustion chamber is supplied with fuel by a fuel injection circuit including a fuel pump including a low pressure stage and a high pressure stage.

The concepts of low and high pressure of the fuel pumps are totally non-correlated with the concepts of low and high pressure of the bodies of the turbojet, concerning the pressure of different fluids; by convention, and to simplify the description, the acronym "HP" will be used for "high pressure" in the following description, and the acronym "LP" for "low pressure", both for the bodies of the turbojet or their elements and for the fuel pumps.

The HP stage of the fuel pump receives, in normal operation, a sufficient pressure at its inlet in order to function. The pressure at the inlet of the HP stage is guaranteed by the LP stage of the pump. The role of the HP stage is to deliver a flow of fuel which is sufficient to supply the combustion chamber and the variable geometries of the complete fuel system. The fuel pump also includes a pressure relief valve allowing the flow leaving the HP stage to be recirculated towards the inlet of the HP stage when the difference in pressure between the inlet and the outlet of the HP stage is too great. This pressure relief valve is generally an internal component of the fuel pump which connects the inlet to the outlet of the HP stage. This pressure relief valve is generally in closed position, but if the difference in pressure between the inlet and the outlet of the HP stage is too great, it opens so as to prevent damaging the HP stage. The pressure relief valve therefore opens more or less as a function of the difference in pressure between the inlet and the outlet of the HP stage. This pressure relief valve is therefore essential.

However, in the case of pollution, of cold, or in the case of rapid opening of the pressure relief valve, the latter can remain locked in the open position, which results in a total or partial recirculation of fuel and prevents the injection of fuel in the combustion chamber and the supplying of the variable geometries of the system. The normal functioning of the system is therefore no longer assured. However, currently, no detection device of a breakdown of the relief valve is provided in turbomachines. Also, in the case of a breakdown of the motor, due to a failure of the pressure relief valve, the maintenance teams have to dismantle all the equipment and test it so as to be able to identify the origin of the breakdown. The maintenance teams have to, in particular, dismantle the fuel pump and inspect it. This operation is long and complicated, and it can prove to be useless in the case where the breakdown of the motor is not due to a breakdown of the pressure relief valve.

SUMMARY

An aspect of the invention relates to a detection method of a breakdown of a pressure relief valve of a fuel injection circuit for a turbomachine. This pressure relief valve is generally designated by the abbreviation PRV for "Pressure Relief Valve".

To do this, according to a first aspect of the invention a method is proposed for detection of a breakdown of a pressure relief valve of a fuel injection circuit for a turbomachine, the injection circuit including a fuel pump including a low pressure stage and a high pressure stage, the low pressure stage having an inlet and an outlet, the high pressure stage having an inlet and an outlet, the low pressure stage being connected to the high pressure stage, the pressure relief valve being connected in parallel with respect to the high pressure stage, the injection circuit further including a recirculation loop including an inlet connected to the outlet of the high pressure stage and an outlet connected to the outlet of the low pressure stage, the method including measuring a differential pressure in the injection circuit.

Thus, the method according to an embodiment of the invention is particularly beneficial, because it allows an inadvertent opening of the pressure relief valve to be detected without having to test the pressure relief valve itself, but solely by monitoring a differential pressure in the injection circuit, which permits the pressure relief valve no longer having to be dismantled in order to know whether it is locked in the open position or not.

Indeed, the inadvertent opening of the pressure relief valve creates a cancellation of the outlet flow of the HP stage of the fuel pump, and this cancellation of the outlet flow of the HP stage will generate a significant drop in the differential pressure measured at different locations of the injection circuit. By choosing the locations at which the differential pressure is measured, one can therefore know whether or not the pressure relief valve is functioning, without having to dismantle this pressure relief valve.

The method according to an embodiment of the invention can also have one or more of the characteristics below, taken individually or according to all the technically possible combinations.

The differential pressure permitting monitoring that the pressure relief valve is not locked in open position can be measured between different locations.

Thus, according to an embodiment, the differential pressure is measured between the outlet of the recirculation loop and the inlet of the high pressure stage. Indeed, the flow which passes between the outlet of the recirculation loop and the inlet of the HP stage corresponds to the total flow pumped by the HP stage. In the case where the pressure relief valve remains locked in the open position, the flow between the outlet of the recirculation loop and the inlet of the high pressure stage is almost zero, such that the difference in pressure between these two points is also almost zero. Thus, when the pressure relief valve is closed, the difference in pressure will be relatively high, whereas if it falls quickly, one deduces therefrom that the pressure relief valve is open.

The low pressure stage can be connected to the high pressure stage solely using a duct. In this case, in an embodiment, the differential pressure is measured between two points of the duct. One can thus know if the pressure relief valve is functioning correctly, even in the case where the fuel pump is very simple.

However, according to an embodiment, the low pressure stage is connected to the high pressure stage using equipment suited to generate a pressure drop. In this case, the differential pressure is measured at the terminal points of this equipment. The fact of measuring the differential pressure at the terminal points of an equipment which generates a pressure drop allows one to have a less precise sensor for measuring the differential pressure, since the pressure drop will be greater, and hence the difference in differential pressure when the pressure relief valve is closed and that when the pressure relieve valve is open will be greater. It will therefore be easier to detect the opening of the pressure relief valve, this being even with a less sensitive sensor.

Beneficially, the pressure drop generated by the equipment is greater than the pressure drop generated by a duct.

The equipment is, for example, a fuel filter of the fuel pump.

Beneficially, the differential pressure is measured by a pressure difference sensor connected to the terminal points of the fuel filter. Indeed, the majority of fuel pumps also include such a pressure difference sensor, which is used furthermore to measure the pressure at the terminal points of the fuel filter. The fact of using this sensor to know whether the pressure relief valve has become locked in the open position permits additional equipment not to be added for monitoring the pressure relief valve and permits the use of equipment which is already present in the injection circuit.

According to another embodiment, the differential pressure is measured between two points of the recirculation loop. Indeed, when the pressure relief valve is closed, a flow exists in the recirculation loop and hence when the pressure relief valve is open, a relatively great differential pressure is measured through the recirculation loop. When the pressure relief valve remains locked in the open position, there is no longer a flow in the recirculation loop and hence an almost zero differential pressure. Thus, if one detects a rapid drop in the differential pressure in the recirculation loop, one deduces therefrom that the pressure relief valve is in the open position.

According to yet another embodiment, the differential pressure is measured between the outlet of the high pressure stage and the inlet of the recirculation loop.

Indeed, as in the preceding case, if one detects a great reduction in the differential pressure between the outlet of the HP stage and the inlet of the recirculation loop, one deduces therefrom that the pressure relief valve is open.

According to an embodiment, the differential pressure is measured between the outlet of the recirculation loop and the inlet of the high pressure stage, since in the case of locking of the pressure relief valve in the open position, also a great reduction in the pressure between these points is detected.

Beneficially, the method further comprises issuing a warning message when the measured differential pressure is less than a threshold value. This warning message can be sent either to the pilot, or to the maintenance teams, or it can be recorded in a memory of the turbo-machine.

BRIEF DESCRIPTION OF THE DRAWINGS

Other characteristics and benefits of the invention will emerge on reading the following detailed description, in reference to the attached drawings, which illustrate.

For greater clarity, the identical or similar elements are marked by identical reference symbols in all of the figures.

DETAILED DESCRIPTION

Figure 1:
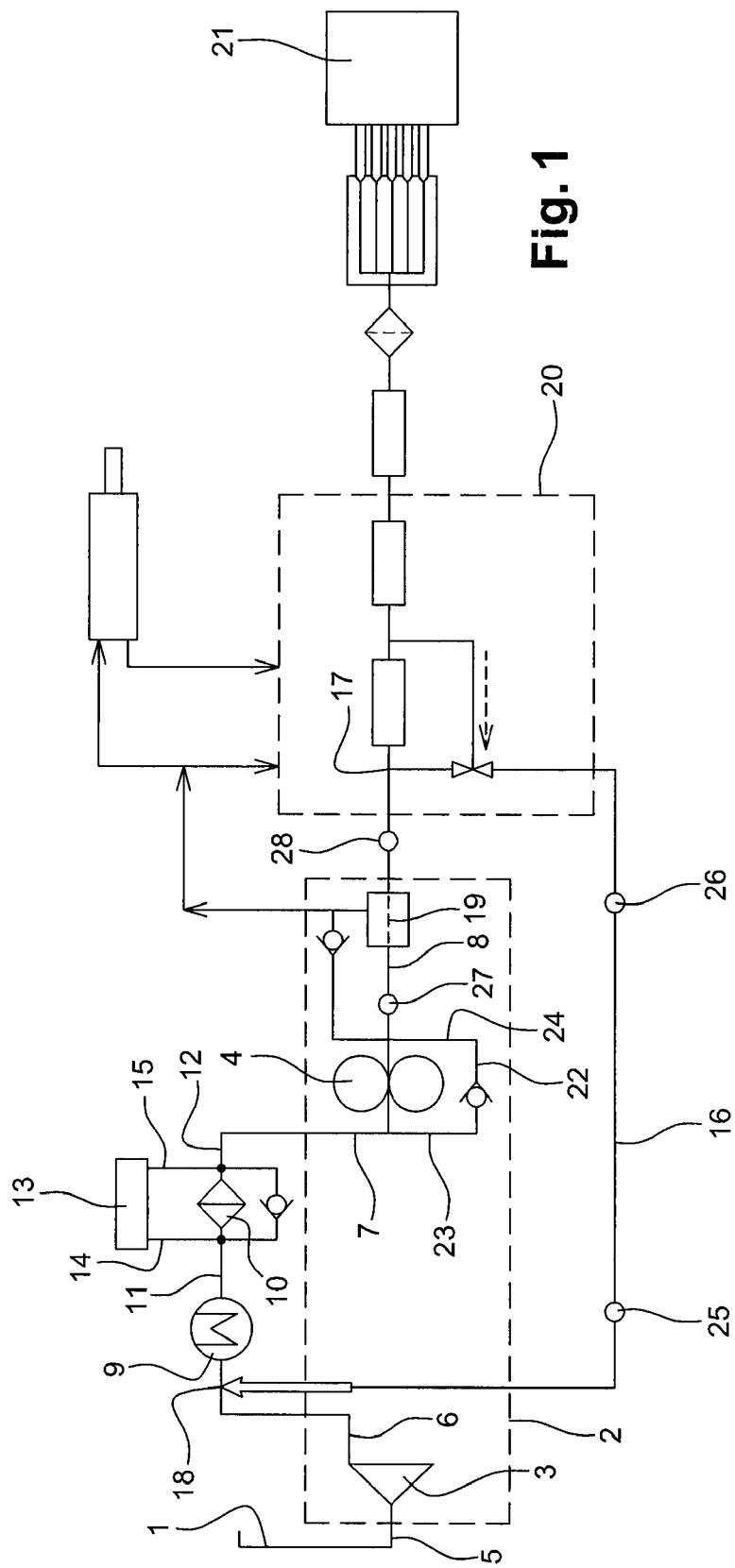
FIG. 1 is a diagrammatic representation of a fuel injection circuit for a turbomachine, permitting fuel to be injected in a combustion chamber of a turbomachine, to which a method according to an embodiment of the invention is applied.
Figure 2:
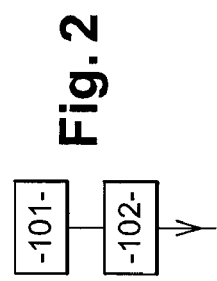
FIG. 2 is a diagrammatic representation of a method according to an embodiment of the invention.

The fuel injection circuit of an embodiment of the invention represented in FIG. 1 includes a fuel supply 1 which is connected to a fuel pump 2.

The fuel pump 2 includes a low pressure stage 3. The low pressure stage 3 includes an inlet 5 connected to the fuel supply 1 and an outlet 6. The low pressure stage 3 permits pressure to be generated upstream of the high pressure stage so as to deliver the necessary flow to the complete fuel system.

Between the LP stage 3 of the fuel pump and the HP stage 4, the system includes a fuel/oil heat exchanger 9 which is connected to the outlet 6 of the low pressure stage. The fuel system includes a fuel filter 10 which includes an inlet 11 connected to the fuel/oil heat exchanger 9 and an outlet 12. The fuel filter 10 permits the impurities present in the fuel to be filtered.

The system also includes a pressure difference sensor 13 connected to the terminal points of the fuel filter 10. Indeed, the pressure difference sensor 13 includes an inlet 14 connected to the inlet 11 of the fuel filter 10 and an outlet 15 connected to the outlet 12 of the fuel filter 10. Thus, the pressure difference sensor 13 is connected in parallel on the fuel filter 10. The pressure difference sensor permits the pressure difference to be measured at the terminal points of the fuel filter 10.

The fuel pump 2 is composed of a high pressure stage 4 which itself includes an inlet 7 and an outlet 8. The inlet 7 of the high pressure stage is connected to the outlet 6 of the low pressure stage 3, here using the heat exchanger 9 and by the fuel filter 10. However, this is not limiting. An embodiment of the invention would equally apply in the case where the low pressure stage 3 was connected directly to the high pressure stage 4 using a duct, or else in the case where the low pressure stage was connected to the high pressure stage using other equipment.

The fuel pump 2 also includes a pressure relief valve 22 which is connected in parallel with respect to the HP stage 4 so as to prevent pressure differences which are too great from occurring between the inlet and the outlet of the HP stage 4. For this, the pressure relief valve 22 includes an inlet 23 connected to the inlet 7 of the HP stage 4 and an outlet 24 connected to the outlet 8 of the HP stage 4. When the pressure difference between the inlet and the outlet of the HP stage is too great, the pressure relief valve 22 opens more or less as a function of the pressure difference between the inlet and the outlet of the HP stage so as to prevent damaging the HP stage 4.

The fuel pump 2 can also include a second fuel filter 19 which is connected to the outlet 8 of the high pressure stage 4.

The injection circuit also includes a recirculation loop 16 which includes an inlet 17 and an outlet 18. The inlet 17 of the recirculation loop 16 is connected to the outlet of the second fuel filter 19 when the fuel pump includes such a filter, or else to the outlet 8 of the high pressure stage 4 when the fuel pump does not include such a filter. The outlet 18 of the recirculation loop 16 is connected to a duct situated between the outlet 6 of the low pressure stage 3 and the inlet of the heat exchanger 9.

The injection circuit also includes a dosing unit 20, also designated FMU for "fuel metering unit", which permits the quantity of fuel to be controlled which is injected in the combustion chamber 21.

Such an injection circuit is known from the prior art and will not be described in further detail here.

The method according to an embodiment of the invention permits a locking of the pressure relief valve 22 in the open position to be detected.

For this, the method according to an embodiment the invention includes a procedure 101 for measuring a differential pressure in the injection circuit.

According to an embodiment, this differential pressure can be measured between the outlet 18 of the recirculation loop 16 and the inlet 7 of the HP stage 4. More precisely, this differential pressure is measured at the terminal points 11, 12 of the fuel filter 10. This differential pressure can thus be measured by using the pressure difference sensor 13 which is already present in the injection circuit, which avoids adding equipment dedicated to the monitoring of the pressure relief valve. Furthermore, the fact of measuring the differential pressure at the terminal points of an equipment such as the fuel filter 10 permits a difference in differential pressure to be detected between the case where the pressure relief valve is closed and the case where it is open, even with a sensor which has little sensitivity.

Thus, in stationary mode, when the pressure relief valve is closed, the differential pressure measured between the inlet 11 and the outlet 12 of the fuel filter 10 by the pressure difference sensor 13 is relatively high. It is, for example, equal to 200 hPa when the filtering element of the main filter is new, and 1800 hPa before the clogging of the filter. On the other hand, if the pressure relief valve remains locked in the open position, the pressure difference measured between the inlet 11 and the outlet 12 of the fuel filter 10 by the pressure difference sensor 13 will fall rapidly. The value which is then measured will be, for example, close to 0 hPa, excepting the uncertainty of the measurement sensor. Thus, if the pressure difference sensor 13 detects that the measured differential pressure is less than a threshold value for a duration greater than 5 s from a pump shaft rate strictly greater than 0 r/min, one deduces therefrom that the pressure relief valve has become locked in the open position.

The method therefore includes a procedure 102 of issuing a warning message indicating that the pressure relief valve is locked in the open position. This warning message can be sent to the destination of the pilot and/or the maintenance services of the apparatus and/or it can be stored so as to keep a history of the breakdowns which have taken place in the turbomachine.

It will be appreciated that the invention is not limited to the embodiments described with reference to the figures, and variants could be envisaged without departing from the scope of the invention.

One could namely envisage measuring the differential pressure at other points than those previously described.

Thus, one could also measure the differential pressure at other points situated between the outlet 18 of the recirculation loop 16 and the inlet of the HP stage 4. One could, for example, measure the differential pressure at the terminal points of the heat exchanger 9 or between the inlet of the heat exchanger 9 and the outlet of the fuel filter 10. One could also measure the differential pressure between two points situated on either side of one of the ducts which connects either the outlet 18 of the recirculation loop to the inlet of the heat exchanger, or the outlet 12 of the fuel filter to the inlet 7 of the HP stage 4.

According to another embodiment, the differential pressure could be measured between two points 25, 26 of the recirculation loop 16. These two points can be situated anywhere between the inlet 17 and the outlet 18 of the regulation loop 16.

According to an embodiment, the differential pressure could also be measured between two points 27, 28 situated between the outlet 8 of the HP stage 4 and the inlet 17 of the recirculation loop 16. In this case, one can for example measure the differential pressure at the terminal points of the second fuel filter 19. Indeed, this second fuel filter generates a great drop pressure, which permits one to have a great difference in differential pressure between the case in which the pressure relief valve is open and that in which it is closed. One can therefore use a sensor which has little sensitivity for detecting a breakdown of the pressure relief valve.

According to an embodiment, one could also measure the differential pressure between the outlet 18 of the recirculation loop 16 and the input 7 of the high pressure stage.

Furthermore, it will be appreciated that the method described above also applies to injection circuits presenting variants with respect to the injection circuit represented in FIG. 1. In particular, this method could also be applied to an injection circuit not including a heat exchanger, and/or not including a fuel filter.

The invention claimed is:

1. A detection method of a breakdown of a pressure relief valve of a fuel injection circuit for a turbomachine, the injection circuit including a fuel pump including a low pressure stage and a high pressure stage, the low pressure stage having an inlet and an outlet, the high pressure stage having an inlet and an outlet, the low pressure stage being connected to the high pressure stage, the pressure relief valve being connected in parallel with respect to the high pressure stage, the injection circuit further including a recirculation loop including an inlet connected to the outlet of the high pressure stage and an outlet connected to the outlet of the low pressure stage, the method comprising measuring a differential pressure in the injection circuit between the outlet of the recirculation loop and the inlet of the high pressure stage.

2. The detection method according to claim 1, wherein the low pressure stage is connected to the high pressure stage with a duct.

3. The detection method according to claim 2, wherein the differential pressure is measured between two points of the duct.

4. The detection method according to claim 1, wherein the low pressure stage is connected to the high pressure stage using an equipment configured to generate a pressure drop, the differential pressure being measured at the terminal points of the equipment.

5. The detection method according to claim 4, wherein the equipment is a fuel filter.

6. The detection method according to claim 5, wherein the differential pressure is measured by a pressure difference sensor connected to the terminal points of the fuel filter.

7. The method according to claim 6, comprising issuing a warning message when the pressure relief valve is locked in the open position.

8. The method according to claim 1, comprising comparing the measured differential pressure in the injection circuit to a threshold value to determine whether the pressure relief valve is in a closed or open position.

* * * * *